United States Patent
Rakshit et al.

(10) Patent No.: US 12,195,203 B2
(45) Date of Patent: Jan. 14, 2025

(54) MANEUVERING SPACECRAFT HAVING SOLAR SAILS

(71) Applicant: International Business Machines Corporation, Armonk, NY (US)

(72) Inventors: Sarbajit K. Rakshit, Kolkata (IN); Sathya Santhar, Chennai (IN); Sridevi Kannan, Tamil Nadu (IN)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 18/060,764

(22) Filed: Dec. 1, 2022

(65) Prior Publication Data

US 2024/0182184 A1   Jun. 6, 2024

(51) Int. Cl.
| | |
|---|---|
| *B64G 1/24* | (2006.01) |
| *B64G 1/36* | (2006.01) |
| *B64G 1/40* | (2006.01) |
| *B64G 3/00* | (2006.01) |

(52) U.S. Cl.
CPC ............. *B64G 1/242* (2013.01); *B64G 1/363* (2013.01); *B64G 1/407* (2013.01); *B64G 3/00* (2013.01)

(58) Field of Classification Search
CPC ........ B64G 1/242; B64G 1/363; B64G 1/407; B64G 3/00; B64G 1/2427; B64G 1/244; B64G 1/26; B64G 1/62; B64G 1/646

See application file for complete search history.

(56) References Cited

U.S. PATENT DOCUMENTS

| | | | |
|---|---|---|---|
| 11,368,212 B2 | 6/2022 | Kalita et al. | |
| 11,424,827 B1 * | 8/2022 | Adams | G02B 27/283 |
| 2013/0032673 A1 | 2/2013 | Kobayashi | |
| 2024/0123843 A1 * | 4/2024 | Rakshit | B60L 53/65 |

OTHER PUBLICATIONS

Himangshu Kalita et al., "Lasers for Communication and Coordination Control of Spacecraft Swarms," arxiv.org, Dated: Jan. 25, 2019, pp. 1-11.

H. Kalita et al., "Use of Laser Beams to Configure and Command Spacecraft Swarms," Guidance, Navigation, and Control (Advances in the Astronautical Sciences), Year: 2019, pp. 979-999.

Ho-Ting Tung et al., "Light-Sail Photonic Design for Fast-Transit Earth Orbital Maneuvering and Interplanetary Flight," arXiv.org, Dated: Jul. 19, 2021, pp. 1-15.

(Continued)

*Primary Examiner* — Richard M Camby
(74) *Attorney, Agent, or Firm* — Patterson + Sheridan, LLP

(57) ABSTRACT

Embodiments herein describe maneuvering a spacecraft using a solar sail when sunlight is not available. Smaller satellites may rely solely on solar sails in order to maneuver to different locations (e.g., different orbits) to adjust for orbital decay, avoid collisions with other satellites, or to avoid space junk. However, solar sails cannot rely on the sun when orbiting on the dark side of a planet (e.g., when in the earth's shadow). When a spacecraft should maneuver but the sun is not available as a power source, the embodiments herein describe identifying other spacecraft within line-of-sight (LOS) of the spacecraft and using these spacecraft to direct lasers (or reflecting sunlight if available) at the spacecraft to maneuver it to a desired path (e.g., a new orbit).

20 Claims, 5 Drawing Sheets

(56) References Cited

OTHER PUBLICATIONS

Craig Freudenrich, "Cruising by Sunlight—How Solar Sail Technology Works," HowStuffWorks, Dated Accessed: Aug. 30, 2022, pp. 1-3.
Nikolaos Perakis, "Maneuvering through solar wind using magnetic sails," ScienceDirect: Acta Astronautica, vol. 177, Dated: Dec. 2020, pp. 122-132.
NASA, "NASA Facts: Solar Sail Propulsion," National Aeronautics and Space Administration, Dated: 2005, pp. 1-2.
Bill Nye, "What is solar salling?" The Planetary Society, Year: 2022, Dated Accessed: Aug. 29, 2022, pp. 1-14.
Robert Miller, "Solar Sails: The math behind solar sails," Date Access: Aug. 29, 2022, pp. 1-5.

\* cited by examiner

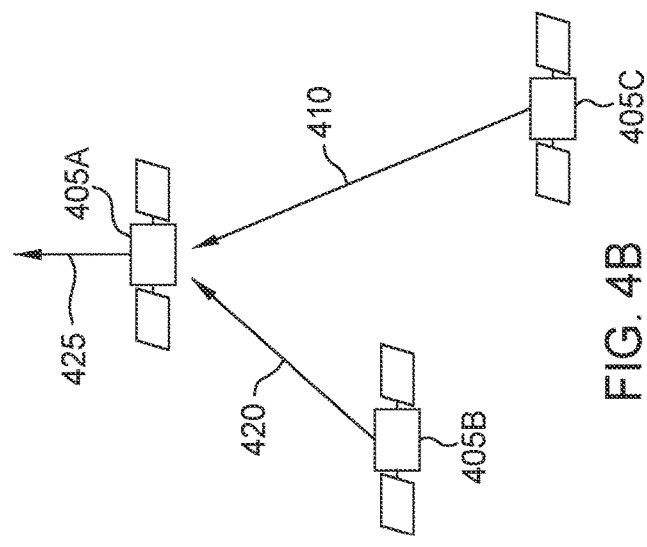
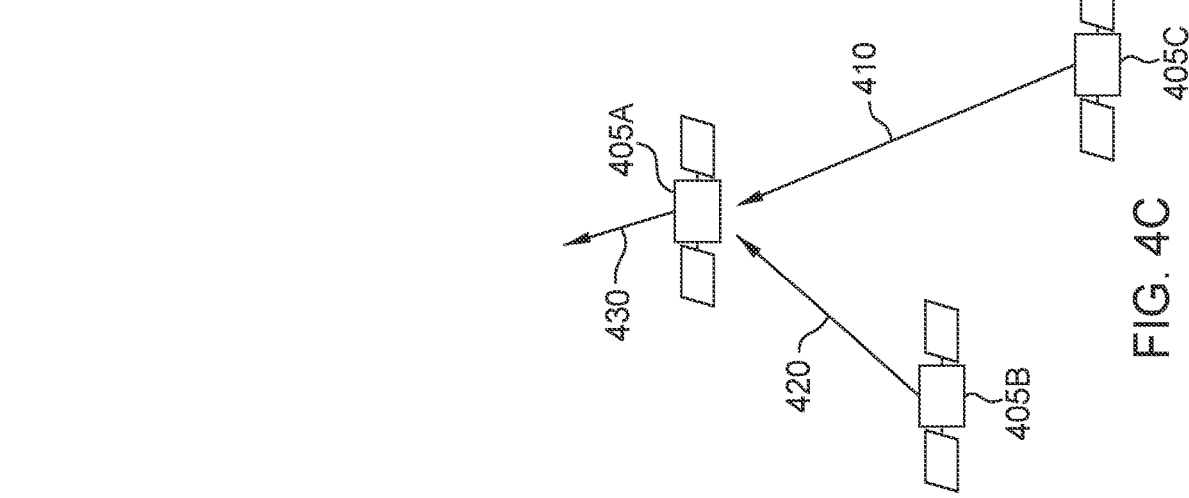
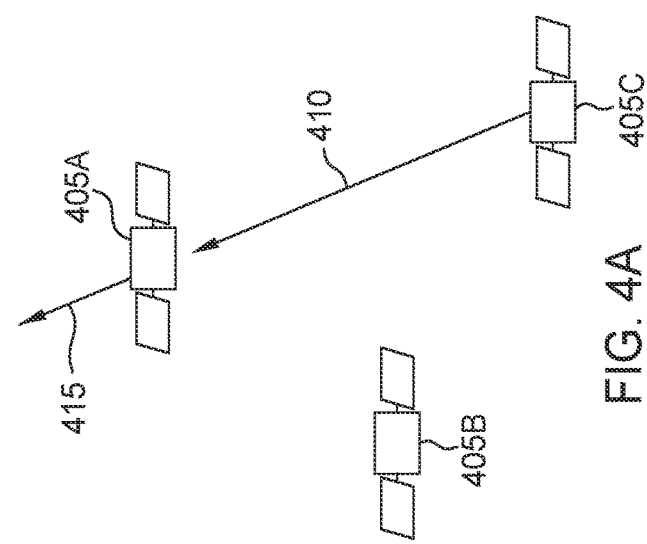

MANEUVERING SPACECRAFT HAVING SOLAR SAILS

BACKGROUND

The present invention relates to using solar sails to maneuver a spacecraft when in a shadow.

Solar sails capture light photons on a surface called a sail. When light hits a solar sail, a force is applied to the solar sail. Solar sails are solely dependent on light as a source of fuel, and as such, the sails become less efficient the further they become from the source of the light. This is because less photons hit the sail.

If relying on the sun to power a solar sail, objects in space such as the earth or moon can block the sun which means the solar sails are essentially useless for propelling the spacecraft. Thus, for spacecraft that rely solely on solar sails, they are left without any maneuvering capabilities when disposed in earth's shadow.

SUMMARY

According to one embodiment of the present invention, a method includes identifying a first spacecraft that needs to be maneuvered, wherein the first spacecraft comprises a solar sail, upon determining the first spacecraft is in a shadow cast by an object in space, identifying a plurality of spacecraft within line of sight (LOS) of the first spacecraft, determining a subset of the plurality of spacecraft that can cause a desired acceleration of the first spacecraft by emitting light at the first spacecraft, and directing light from the subset of the plurality of spacecraft to the solar sail of the first spacecraft. Non-limiting advantages of this method include being able to maneuver spacecraft that rely on solar sails even when these spacecraft are within the shadow of an object (e.g., the earth). Further, the method has the advantage of determine which spacecraft are in a current position to cause a desired acceleration of the first spacecraft since some spacecraft may not be in a suitable position.

In addition to the method above and the methods below, the plurality of spacecraft each comprise a laser which can be controlled to emit light at the first spacecraft. Non-limiting advantages of this include that the spacecraft have their own means to direct light at a solar sail, rather than having to rely on reflecting sunlight.

In addition to any of the methods above and the methods below, the subset of the plurality of spacecraft includes two or more spacecraft, wherein the two or more spacecraft direct light at the first spacecraft simultaneously. Non-limiting advantages of this include having more control of the direction of the desired acceleration, relative to using only one spacecraft to direct light at the first spacecraft. For example, controlling the intensity of the light emitted by the two or more spacecraft can change the direction of the desired acceleration of the first spacecraft.

In addition, any of the methods above or below can include, after directing light from the subset of the plurality of spacecraft to the solar sail of the first spacecraft: determining whether the first spacecraft is on a desired path and upon determining the first spacecraft is not yet on the desired path and the first spacecraft is still in the shadow: identifying a second plurality of spacecraft within LOS of the first spacecraft, determining a second subset of the plurality of spacecraft that can cause the desired acceleration of the first spacecraft by emitting light at the first spacecraft, and directing light from the second subset of the plurality of spacecraft to the solar sail of the first spacecraft. Non-limiting advantages of this include updating which of the spacecraft should be used to direct light at the first spacecraft since the relative locations of the spacecraft can change when they are in motion.

In addition, any of the methods above or below can include, after directing light from the subset of the plurality of spacecraft to the solar sail of the first spacecraft: upon determining the first spacecraft is not yet on a desired path and the first spacecraft is no longer in the shadow: relying on sunlight to move the first spacecraft to the desired path and instructing the subset of the plurality of spacecraft to no longer direct light at the first spacecraft. Non-limiting advantages of this include switching to using the sun to move the first spacecraft which can conserve power in the other spacecraft since they no longer have to direct light (e.g., power lasers) to move the first spacecraft.

According to one embodiment of the present invention, a computer program product includes machine readable code that performs an operation that includes upon determining the first spacecraft is in a shadow cast by an object in space, identifying a plurality of spacecraft within LOS of the first spacecraft, determining a subset of the plurality of spacecraft that can cause a desired acceleration of the first spacecraft by emitting light at the first spacecraft, and directing light from the subset of the plurality of spacecraft to the solar sail of the first spacecraft. Non-limiting advantages of this computer program product include being able to maneuver spacecraft that rely on solar sails even when these spacecraft are within the shadow of an object (e.g., the earth). Further, the method has the advantage of determining which spacecraft are in a current position to cause a desired acceleration of the first spacecraft since some spacecraft may not be in a suitable position.

According to one embodiment of the present invention, a system that includes a first spacecraft having a solar sail, a plurality of spacecraft that are within LOS of the first spacecraft, and a spacecraft maneuvering system. The spacecraft maneuvering system is configured to identify that the first spacecraft needs to be maneuvered, upon determining the first spacecraft is in a shadow cast by an object in space, determine a subset of the plurality of spacecraft that can cause a desired acceleration of the first spacecraft by emitting light at the first spacecraft, and direct light from the subset of the plurality of spacecraft to the solar sail of the first spacecraft. Non-limiting advantages of this system include being able to maneuver spacecraft that rely on solar sails even when these spacecraft are within the shadow of an object (e.g., the earth). Further, the method has the advantage of determining which spacecraft are in a current position to cause a desired acceleration of the first spacecraft since some spacecraft may not be in a suitable position.

BRIEF DESCRIPTION OF THE DRAWINGS

FIGS. 4A-4C illustrate different techniques for using secondary spacecraft to maneuver a primary spacecraft with a solar sail, according to embodiments.

DETAILED DESCRIPTION

Embodiments herein describe maneuvering a spacecraft (e.g., a satellite) using a solar sail when sunlight is not available. Smaller satellites may rely solely on solar sails in order to maneuver to different locations (e.g., different orbits) to adjust for orbital decay, avoid collisions with other satellites, or to avoid space junk. However, solar sails cannot rely on the sun when orbiting on the dark side of a planet (e.g., when in the earth's shadow). Thus there is a need to maneuver spacecraft that rely on solar sails when these spacecraft are in an object's shadow. When a spacecraft should maneuver but the sun is not available as a power source, the embodiments herein describe identifying other spacecraft (e.g., other satellites) within line-of-sight (LOS) of the spacecraft and using these spacecraft to direct lasers (or reflecting sunlight if available) at the spacecraft to maneuver it to a desired path (e.g., a new orbit).

In one embodiment, not all of the spacecraft within LOS may be able to emit a laser to direct the spacecraft with a solar sail to its desired path. For example, if a spacecraft is in a higher orbit than the current orbit of the spacecraft being maneuvered, it may be unable to emit a laser that can cause a force to move the spacecraft in the direction of the desired path. In contrast, a spacecraft (or multiple spacecraft) in a lower orbit than the current orbit of the spacecraft being maneuvered may be able to emit a laser that results in a force to maneuver the spacecraft to the desired path. In the embodiments herein, a maneuvering system can identify spacecraft within LOS and then determine which of those spacecraft should be used to emit laser or reflected sunlight to move the spacecraft with the solar sail to the desired path.

Figure 1:
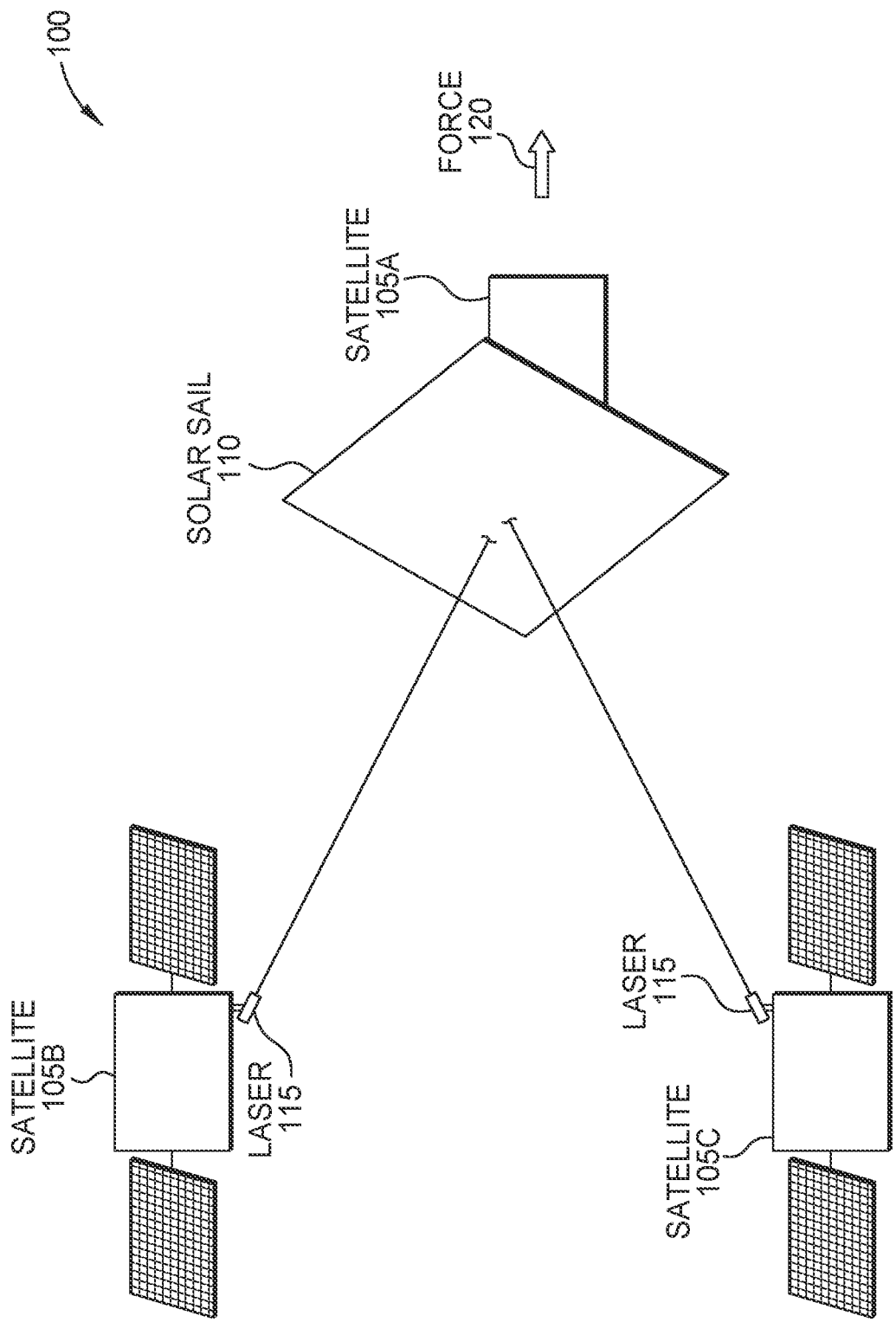
FIG. 1 illustrates using secondary spacecraft to maneuver a primary spacecraft with a solar sail, according to one embodiment.

FIG. 1 illustrates using secondary spacecraft to maneuver a primary spacecraft with a solar sail, according to one embodiment. In this example, the system 100 includes three spacecraft—satellite 105A, satellite 105B, and satellite 105C. The embodiments herein use satellites as an example of a spacecraft, but the embodiments herein can be applied to any spacecraft that relies on a solar sail for movement.

Here, the satellite 105A includes a solar sail 110 which uses radiation pressure exerted by light (e.g., sunlight, lasers, etc.) to propel the satellite 105A. However, the embodiments herein are not limited to any particular type of solar sail 110. In one embodiment, the satellite 105A may rely solely on the solar sail 110 to maneuver. That is, the only propulsion system on the satellite 105A may be the solar sail 110. However, in other embodiments, the satellite 105A can have other propulsion systems in addition to the solar sail 110.

The satellites 105B and 105C are within LOS of the satellite 105A. Further, these satellites 105B and 105C include lasers 115 which can be used to emit a laser beam towards the solar sail 110 in order to result in a force 120 on the satellite 105A. In one embodiment, the lasers 115 can be used when the satellite 105A is unable to receive sunlight. The lasers 115 provide a force on the solar sail that, in turn, provides the force 120 to change the path of the satellite 105A. More generally, the light emitted by the lasers 115 cause an acceleration on the satellite 105A.

In one embodiment, the satellites 105B and 105C may be specially designed satellites with high-powered laser for maneuvering other satellites with solar sails 110. Alternatively, using the laser 115 to move other satellites may be a secondary function of the satellites 105B and 105C.

Although not shown, in one embodiment, the satellite 105A may also include a laser 115 which can be used to maneuver other satellites with solar sails. For example, the satellites 105B and 105C may also include solar sails. Thus, at one point in time, the satellites 105B and 105C use their lasers to maneuver the satellite 105A but at another point in time, the satellite 105A may use its laser to maneuver one of the satellites 105B or 105C. For example, the satellites 105A and 105C may use their lasers to maneuver the satellite 105C.

Figure 2:
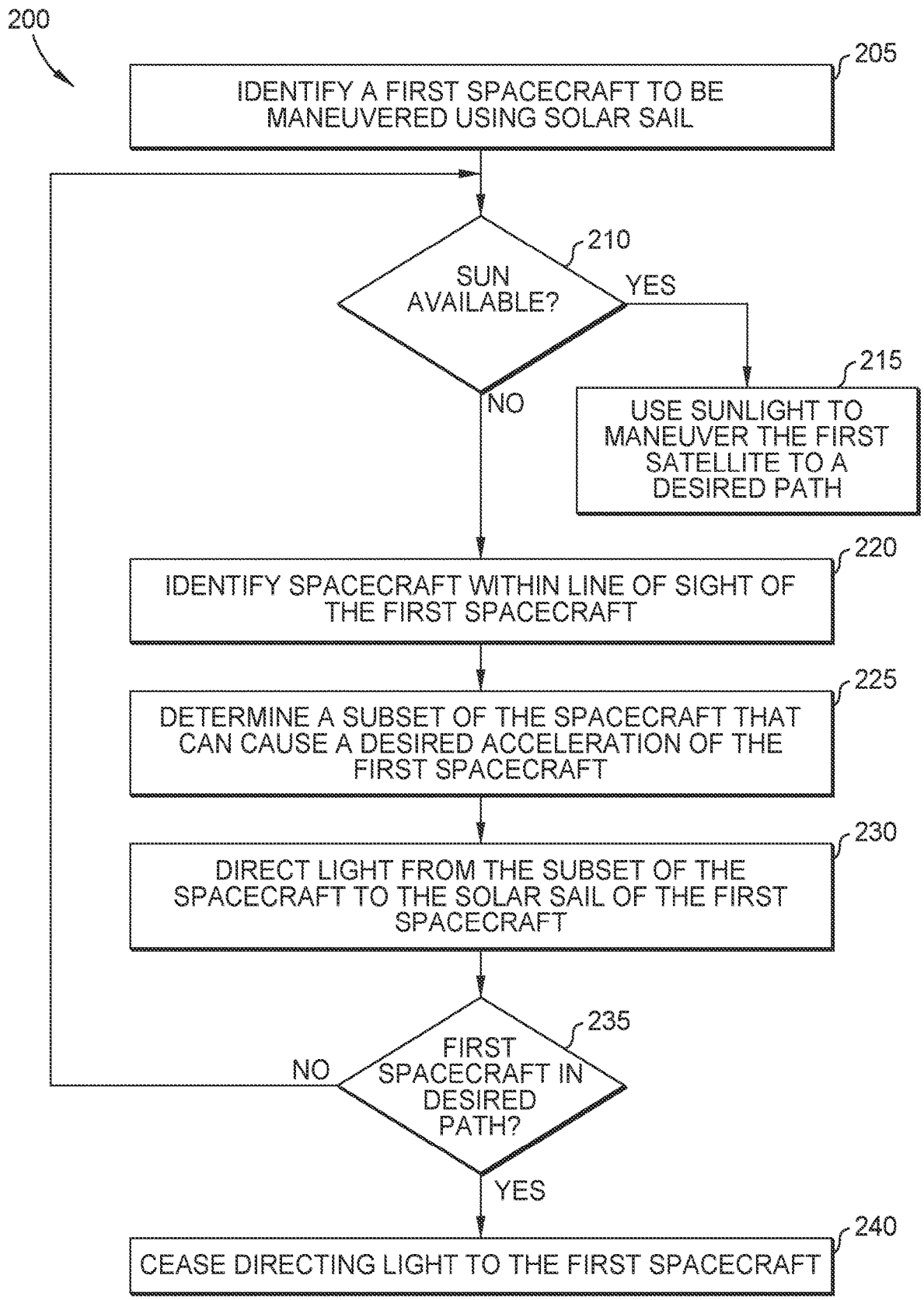
FIG. 2 is a flowchart for selecting spacecraft to use to maneuver a spacecraft with a solar sail when in a shadow, according to one embodiment.
Figure 5:
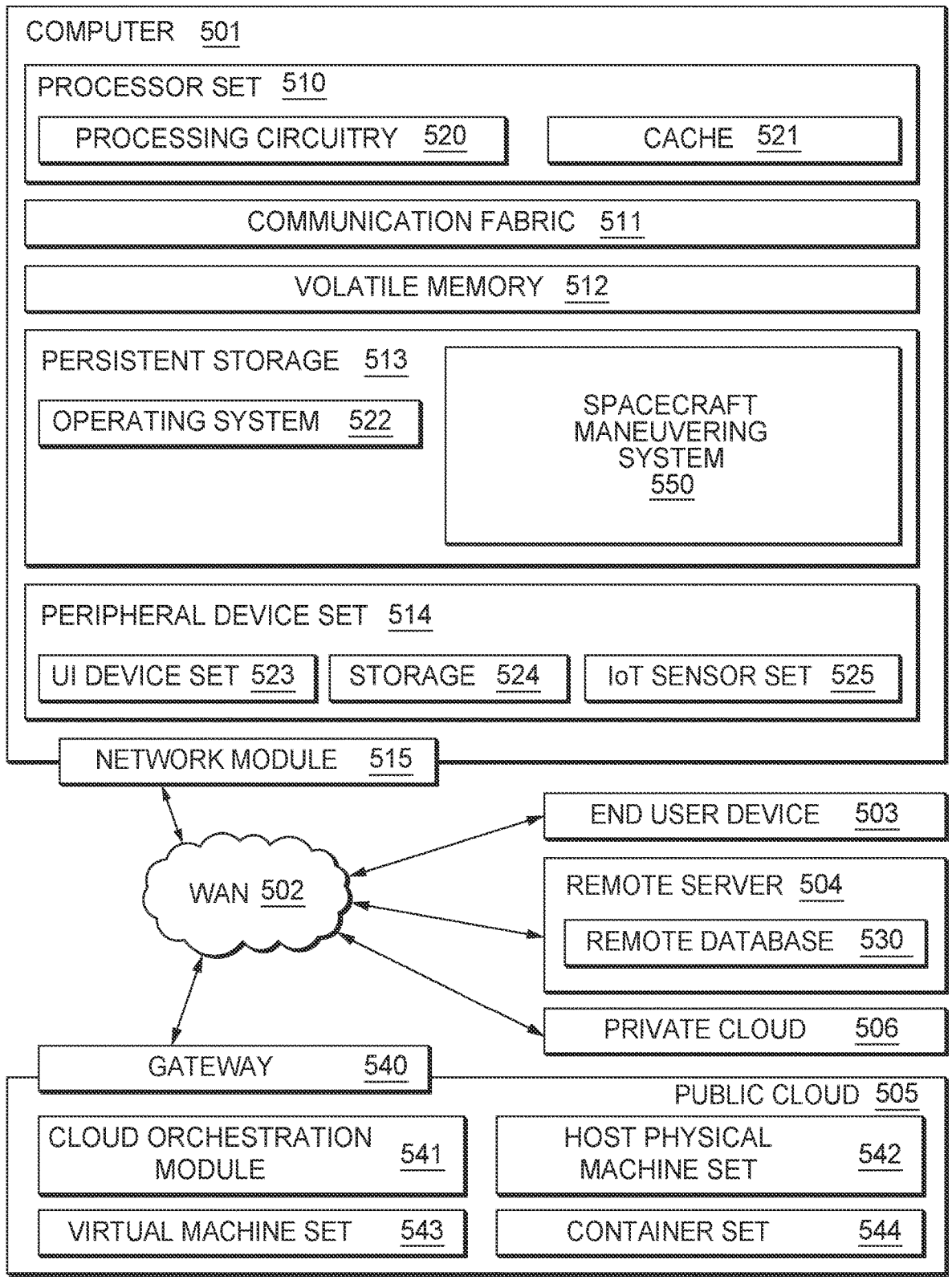
FIG. 5 is a block diagram of a computing environment, according to one embodiment.

FIG. 2 is a flowchart for selecting spacecraft to use to maneuver a spacecraft with a solar sail when in a shadow, according to one embodiment. The method 200 can be performed using a spacecraft maneuvering system which may include one or more software applications executing on a computing system such as the spacecraft maneuvering system 550 in FIG. 5. The spacecraft maneuvering system can be executed on a single computing system (e.g., a server), a data center (e.g., a cloud computing environment), or could be fully or partially executed on computing systems in the spacecraft.

At block 205, the spacecraft maneuvering system identifies a first spacecraft to be maneuvered using a solar sail. For example, a space command center may determine that the orbit of the first spacecraft (e.g., a satellite) has decayed and needs to be put into a different orbit, or that the first spacecraft is on a collision course with another spacecraft. In yet another embodiment, the spacecraft may not be in orbit but may be traveling between different planets. The solar sail may be the only source of propulsion for the first spacecraft, or the solar sail may be one of multiple propulsion sources available to the first spacecraft.

At block 210, the spacecraft maneuvering system determines whether the sun is available. That is, the method 200 assumes the first spacecraft is close enough to the sun that it can be used as the primary light source for powering the solar sail. For example, the first spacecraft may be orbiting the earth or another planet close to the sun. In another example, the first spacecraft may be just beginning its journey from the earth to a distant planet and is primarily relying on the solar sail to accelerate the spacecraft to the distant planet.

If the sun is available, the method 200 proceeds to block 215 where the first spacecraft uses sunlight to maneuver to a desired path. For example, the first spacecraft may orient its solar sail so it has a desired orientation with the sun where the sunlight results in a force that moves the first spacecraft to a desired path. This path could be a new orbit (e.g., to avoid a collision) or an acceleration in the current path (e.g., to accelerate the spacecraft to a distant planet).

However, if the sun is not available because the first spacecraft is in a shadow of a planet (e.g., the earth or the moon is between the spacecraft and the sun), the method 200 proceeds to block 220 where the spacecraft maneuvering system identifies spacecraft within LOS of the first spacecraft. Spacecraft in LOS of the first spacecraft have the ability to use lasers to cause an acceleration of the solar sail of the first spacecraft.

In one embodiment, the spacecraft maneuvering system can maintain a list of satellites orbiting the earth that have lasers for propelling solar sails. When a satellite should be maneuvered, the spacecraft maneuvering system can query the list to determine which of these satellites are currently within LOS of the satellite.

At block 225, the spacecraft maneuvering system determines a subset of the spacecraft identified at block 220 that can cause a desired acceleration of the first spacecraft. That is, only some of the spacecraft identified at block 220 may be have a current position which permits them to emit a laser that causes an acceleration of the first spacecraft in a desired direction. For example, assume the spacecraft maneuvering system wants to propel the first spacecraft to a higher orbit. Some of the spacecraft identified at block 220 may have higher orbits than the first spacecraft. Depending on where these spacecraft are in their orbits, they may be unable to emit a laser that causes the first spacecraft to move to a higher orbit. However, if the spacecraft maneuvering system was attempting to move the first spacecraft to a lower orbit, then these spacecraft would be able to emit a laser that causes the first spacecraft to move to a lower orbit. This is discussed in more detail in FIG. 3.

At block 230, the spacecraft maneuvering system directs light from the subset of the spacecraft to the solar sail of the first spacecraft. The subset of spacecraft can be any number of spacecraft—e.g., one, two, three, etc. If the subset of spacecraft includes multiple spacecraft, these spacecraft can emit their lasers at the same time or at different times. FIGS. 4A-4C discusses using different combinations of spacecraft to result in a desired acceleration or force on the first spacecraft.

In addition to controlling the number of spacecraft that emit lasers at the first spacecraft, the spacecraft maneuvering system can also control the power of the lasers used by the spacecraft. For example, the spacecraft maneuvering system may instruct one spacecraft to use less power when emitting its laser at the first spacecraft than another laser. Or, if the spacecraft have multiple lasers, the spacecraft maneuvering system may instruct one spacecraft to emit three lasers at the first spacecraft while another spacecraft uses only one laser. Varying the intensity of the laser light striking the solar sail can change the resulting force or acceleration on the first spacecraft which is also discussed in FIGS. 4A-4C.

At block 235, the spacecraft maneuvering system determines whether the first spacecraft is on the desired path. For example, the spacecraft maneuvering system can determine whether the subset of spacecraft has successfully moved the first spacecraft to a new, desired orbit, or successfully accelerated the first spacecraft to a desired speed. If so, the method 200 proceeds to block 240 where the spacecraft maneuvering system ceases directing the light to the first spacecraft.

However, if the first spacecraft has not yet reached its desired path, the method 200 returns to block 210 where the spacecraft maneuvering system determines whether sunlight is available. If so, the sunlight is used to maneuver the first spacecraft which means the spacecraft previously used to direct light at the first spacecraft can stop or cease which can means they can advantageously save power.

If not, the blocks 220-230 are repeated since both the first spacecraft and the neighboring spacecraft may constantly be moving. For example, a spacecraft that was previously not in LOS of the first spacecraft may now be in LOS, and thus, is a candidate for being used to maneuver the first spacecraft. Or a spacecraft that was previously used to emit a laser at the first spacecraft may have now moved to a relative position such that it can no longer emit a laser that generates the desired acceleration of the first spacecraft. Thus, the method 200 can repeat at a desired interval as the spacecraft change relative positions.

Figure 3:
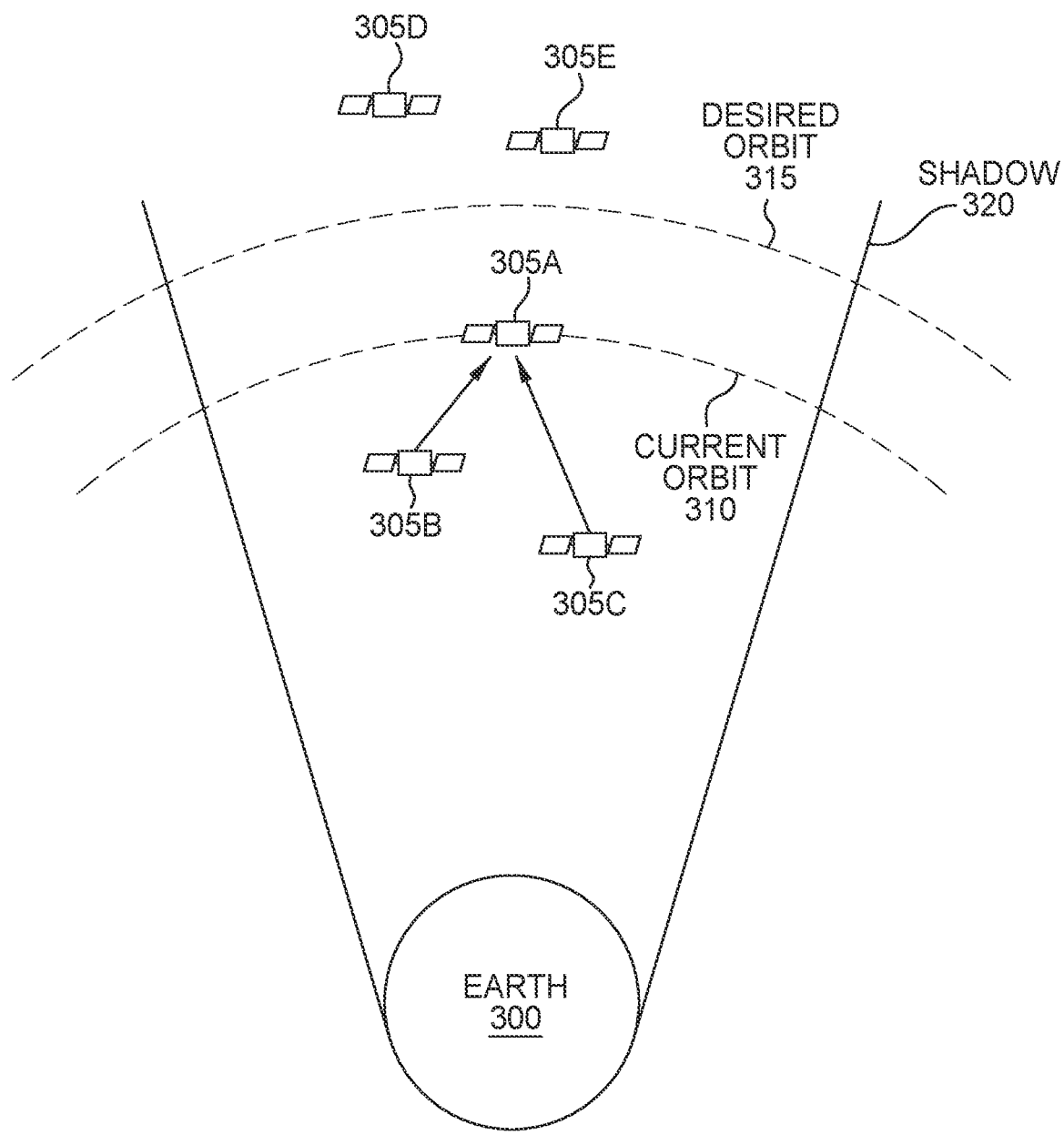
FIG. 3 illustrates using secondary spacecraft to maneuver a primary spacecraft with a solar sail to a different orbit, according to one embodiment.

FIG. 3 illustrates using secondary spacecraft to maneuver a primary spacecraft with a solar sail to a different orbit, according to one embodiment. In this example, the spacecraft 305 are within a shadow 320 cast by the earth 300 (or any other object in space). Further, it is assumed that the spacecraft 305A has a solar sail and the spacecraft maneuvering system wants to maneuver the spacecraft 305A from its current orbit 310 to a desired orbit 315 (e.g., a desired path).

As described at block 220 of method 200, the spacecraft maneuvering system may identify spacecraft within LOS of the spacecraft 305A. In this case, the spacecraft 305B-E are within LOS of the spacecraft 305A. It is further assumed these spacecraft 305B-E include lasers that can be used to emit light that strikes the solar sail(s) of the spacecraft 305A. Thus, the spacecraft 305B-E can be considered as candidate spacecraft to maneuver the spacecraft 305A.

As described at block 225 of method 200, the spacecraft maneuvering system determines a subset of the spacecraft that can cause a desired acceleration of the spacecraft 305A. In this example, the spacecraft maneuvering system determines that the spacecraft 305B and 305C are in a position relative to the spacecraft 305A such that they can emit light that causes a desired acceleration on the spacecraft 305A. That is, the spacecraft maneuvering system is trying to move the spacecraft 305A to the desired orbit 315 that is farther than its current orbit 310 from the earth. Because the spacecraft 305D and 305E are currently at higher positions than the spacecraft 305A, if they emitted light at the spacecraft 305A they may cause an undesired acceleration that moves the spacecraft 305A in the wrong direction (e.g., a lower orbit). However, the spacecraft 305B and 305C have lower positions than the spacecraft 305A and thus in this example are able to emit light that cause a desired acceleration to move the spacecraft 305A towards the desired orbit 315.

FIG. 3 illustrates the spacecraft 305B and 305C emitting laser light that strikes the solar sail of the spacecraft 305A that cause an acceleration to move the spacecraft 305A to its desired orbit 315. The spacecraft 305B and 305C may emit light at the spacecraft 305A at the same time or in a time interleaved manner. Further, the spacecraft 305B and 305C may be sufficient to move the spacecraft 305A to the desired orbit 315. In other examples, the spacecraft 305B and 305C may be insufficient to move the spacecraft 305A to the desired orbit 315 in which case the sun may be used to move the spacecraft 305A to the desired orbit after it moves out of the shadow 320.

In another embodiment, the system can include a spacecraft that is outside the shadow 320. If this spacecraft has a location relative to the spacecraft 305A that enables it to emit light that causes a desired acceleration of the spacecraft 305A, the spacecraft outside the shadow can be used to move the spacecraft 305A towards the desired orbit 315. Since this spacecraft is outside of the shadow, it may emit reflected sunlight towards the spacecraft 305A rather than using a laser to emit light to the spacecraft 305A. Thus, the embodiments herein are not limited to using lasers to maneuver the spacecraft 305A and can emit reflected sunlight towards a spacecraft that is currently in a shadow 320 of an object.

FIGS. 4A-4C illustrate different techniques for using secondary spacecraft 405B and 405C to maneuver a primary spacecraft 405A with a solar sail, according to embodiments. FIG. 4A illustrates the spacecraft 405C emitting light (e.g., light generated using a laser or reflected sunlight) at the spacecraft 405A along the direction indicated by the arrow 410. This emitted light causes an acceleration on the spacecraft 405A in the direction of the arrow 415.

Although not shown in FIG. 4A, in another time period the spacecraft 405B can emit light at the spacecraft 405A while the spacecraft 405C stops emitting light at the spacecraft 405A which causes a different acceleration on the spacecraft 405A. In one embodiment, the spacecraft 405B and 405C take turns in a time interleaved manner emitting light at the spacecraft 405A in order to cause accelerations that move the spacecraft 405A closer to a desired path or location.

FIG. 4B illustrates both of the spacecraft 405B and 405C emitting light at the spacecraft 405A simultaneously as shown by the arrows 410 and 420. In this example, the light emitted by the spacecraft 405B and 405C causes an acceleration on the spacecraft 405A shown by arrow 425 that is a combination of the forces applied by the spacecraft 405B and 405C. Thus, a vector of the acceleration (both magnitude and direction) shown by the arrow 425 is determined by a combination of the light emitted by the spacecraft 405B and 405C.

Like FIG. 4B, FIG. 4C illustrates both of the spacecraft 405B and 405C emitting light at the spacecraft 405A simultaneously as shown by the arrows 410 and 420. However, the acceleration caused on the spacecraft 405A as shown by the arrow 430 is different than the acceleration caused on the spacecraft 405A in FIG. 4B. The difference in the direction of the acceleration is due to the spacecraft 405B and 405C emitting light at different power levels relative to the power levels used in FIG. 4B. For example, the spacecraft 405C may emit light with a greater intensity than it did in FIG. 4B, or the spacecraft 405B may emit light at a lower intensity than it did in FIG. 4B, thereby causing the acceleration to have a different direction as illustrated by arrow 430.

FIGS. 4B and 4C illustrate that the spacecraft maneuvering system can consider and control the intensity of the light emitted by the lasers on the spacecraft 405B and 405C (or the amount of sunlight that is reflected) in order to achieve a desired acceleration on the spacecraft 405A. For example, at block 230 of the method 200, the spacecraft maneuvering system may instruct the subset of the spacecraft to emit light at different power intensities to result in the desired acceleration. The spacecraft maneuvering system can also consider the distance between the primary spacecraft 405A and the secondary spacecraft 405B and 405C when setting the intensity of the lasers since the intensity generally decreases with the distance the light travels before reaching the primary spacecraft 405A. In this manner, the spacecraft maneuvering system can use the intensity of the light emitted by the spacecraft 405B and 405C to control the magnitude and direction of the acceleration of the spacecraft 405A.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code involved in performing the inventive methods, such as the spacecraft maneuvering system 550 which can perform many of the embodiments discussed above. In addition to spacecraft maneuvering system 550, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and the spacecraft maneuvering system 550, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 200 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

While the foregoing is directed to embodiments of the present invention, other and further embodiments of the invention may be devised without departing from the basic scope thereof, and the scope thereof is determined by the claims that follow.

What is claimed is:

1. A method comprising:
    identifying a first spacecraft that needs to be maneuvered, wherein the first spacecraft comprises a solar sail;
    upon determining the first spacecraft is in a shadow cast by an object in space, identifying a plurality of spacecraft within line of sight (LOS) of the first spacecraft;
    determining a subset of the plurality of spacecraft that can cause a desired acceleration of the first spacecraft by emitting light at the first spacecraft; and directing light from the subset of the plurality of spacecraft to the solar sail of the first spacecraft.

2. The method of claim 1, wherein the plurality of spacecraft each comprise a laser which can be controlled to emit light at the first spacecraft.

3. The method of claim 1, wherein directing light from the subset of the plurality of spacecraft to the solar sail comprises at least one of: emitting light from one or more lasers on the subset of the plurality of spacecraft or reflecting sunlight at the subset of the plurality of spacecraft in a direction towards the solar sail.

4. The method of claim 1, wherein the subset of the plurality of spacecraft comprises two or more spacecraft, wherein the two or more spacecraft direct light at the first spacecraft simultaneously.

5. The method of claim 1, wherein the first spacecraft and the plurality of spacecraft are satellites orbiting the object casting the shadow.

6. The method of claim 1, further comprising, after directing light from the subset of the plurality of spacecraft to the solar sail of the first spacecraft:
- determining whether the first spacecraft is on a desired path; and
- upon determining the first spacecraft is not yet on the desired path and the first spacecraft is still in the shadow:
  - identifying a second plurality of spacecraft within LOS of the first spacecraft,
  - determining a second subset of the plurality of spacecraft that can cause the desired acceleration of the first spacecraft by emitting light at the first spacecraft, and
  - directing light from the second subset of the plurality of spacecraft to the solar sail of the first spacecraft.

7. The method of claim 1, further comprising, after directing light from the subset of the plurality of spacecraft to the solar sail of the first spacecraft:
- upon determining the first spacecraft is not yet on a desired path and the first spacecraft is no longer in the shadow:
  - relying on sunlight to move the first spacecraft to the desired path, and
  - instructing the subset of the plurality of spacecraft to no longer direct light at the first spacecraft.

8. A computer program product for maneuvering a first spacecraft comprising a solar sail, the computer program product comprising:
- a computer-readable storage medium having machine readable code embodied therewith, the machine readable code executable by one or more computer processors to perform an operation, the operation comprising:
  - upon determining the first spacecraft is in a shadow cast by an object in space, identifying a plurality of spacecraft within LOS of the first spacecraft;
  - determining a subset of the plurality of spacecraft that can cause a desired acceleration of the first spacecraft by emitting light at the first spacecraft; and
  - directing light from the subset of the plurality of spacecraft to the solar sail of the first spacecraft.

9. The computer program product of claim 8, wherein the plurality of spacecraft each comprise a laser which can be controlled to emit light at the first spacecraft.

10. The computer program product of claim 8, wherein directing light from the subset of the plurality of spacecraft to the solar sail comprises at least one of: emitting light from one or more lasers on the subset of the plurality of spacecraft or reflecting sunlight at the subset of the plurality of spacecraft in a direction towards the solar sail.

11. The computer program product of claim 8, wherein the subset of the plurality of spacecraft comprises two or more spacecraft, wherein the two or more spacecraft direct light at the first spacecraft simultaneously.

12. The computer program product of claim 8, wherein the first spacecraft and the plurality of spacecraft are satellites orbiting the object casting the shadow.

13. The computer program product of claim 8, wherein the operation further comprises, after directing light from the subset of the plurality of spacecraft to the solar sail of the first spacecraft:
- determining whether the first spacecraft is on a desired path; and
- upon determining the first spacecraft is not yet on the desired path and the first spacecraft is still in the shadow:
  - identifying a second plurality of spacecraft within LOS of the first spacecraft,
  - determining a second subset of the plurality of spacecraft that can cause the desired acceleration of the first spacecraft by emitting light at the first spacecraft, and
  - directing light from the second subset of the plurality of spacecraft to the solar sail of the first spacecraft.

14. The computer program product of claim 8, wherein the operation further comprises, after directing light from the subset of the plurality of spacecraft to the solar sail of the first spacecraft:
- upon determining the first spacecraft is not yet on a desired path and the first spacecraft is no longer in the shadow:
  - relying on sunlight to move the first spacecraft to the desired path, and
  - instructing the subset of the plurality of spacecraft to no longer direct light at the first spacecraft.

15. A system, comprising:
- a first spacecraft comprising a solar sail;
- a plurality of spacecraft that are within LOS of the first spacecraft; and
- a spacecraft maneuvering system configured to:
  - identify that the first spacecraft needs to be maneuvered;
  - upon determining the first spacecraft is in a shadow cast by an object in space, determine a subset of the plurality of spacecraft that can cause a desired acceleration of the first spacecraft by emitting light at the first spacecraft; and
  - direct light from the subset of the plurality of spacecraft to the solar sail of the first spacecraft.

16. The system of claim 15, wherein the plurality of spacecraft each comprise a laser which can be controlled to emit light at the first spacecraft.

17. The system of claim 15, wherein directing light from the subset of the plurality of spacecraft to the solar sail comprises at least one of: emitting light from one or more lasers on the subset of the plurality of spacecraft or reflecting sunlight at the subset of the plurality of spacecraft in a direction towards the solar sail.

18. The system of claim 15, wherein the subset of the plurality of spacecraft comprises two or more spacecraft, wherein the two or more spacecraft direct light at the first spacecraft simultaneously.

19. The system of claim 15, wherein the first spacecraft and the plurality of spacecraft are satellites orbiting the object casting the shadow.

20. The system of claim 15, wherein the spacecraft maneuvering system is configured to, after directing light from the subset of the plurality of spacecraft to the solar sail of the first spacecraft:
- determine whether the first spacecraft is on a desired path; and
- upon determining the first spacecraft is not yet on the desired path and the first spacecraft is still in the shadow:
  - identify a second plurality of spacecraft within LOS of the first spacecraft,
  - determine a second subset of the plurality of spacecraft that can cause the desired acceleration of the first spacecraft by emitting light at the first spacecraft, and
  - direct light from the second subset of the plurality of spacecraft to the solar sail of the first spacecraft.

* * * * *